June 2, 1925.　　　　　　　　J. F. HAYDEN　　　　　　　1,540,470
MUD HOOK
Filed Oct. 6, 1924
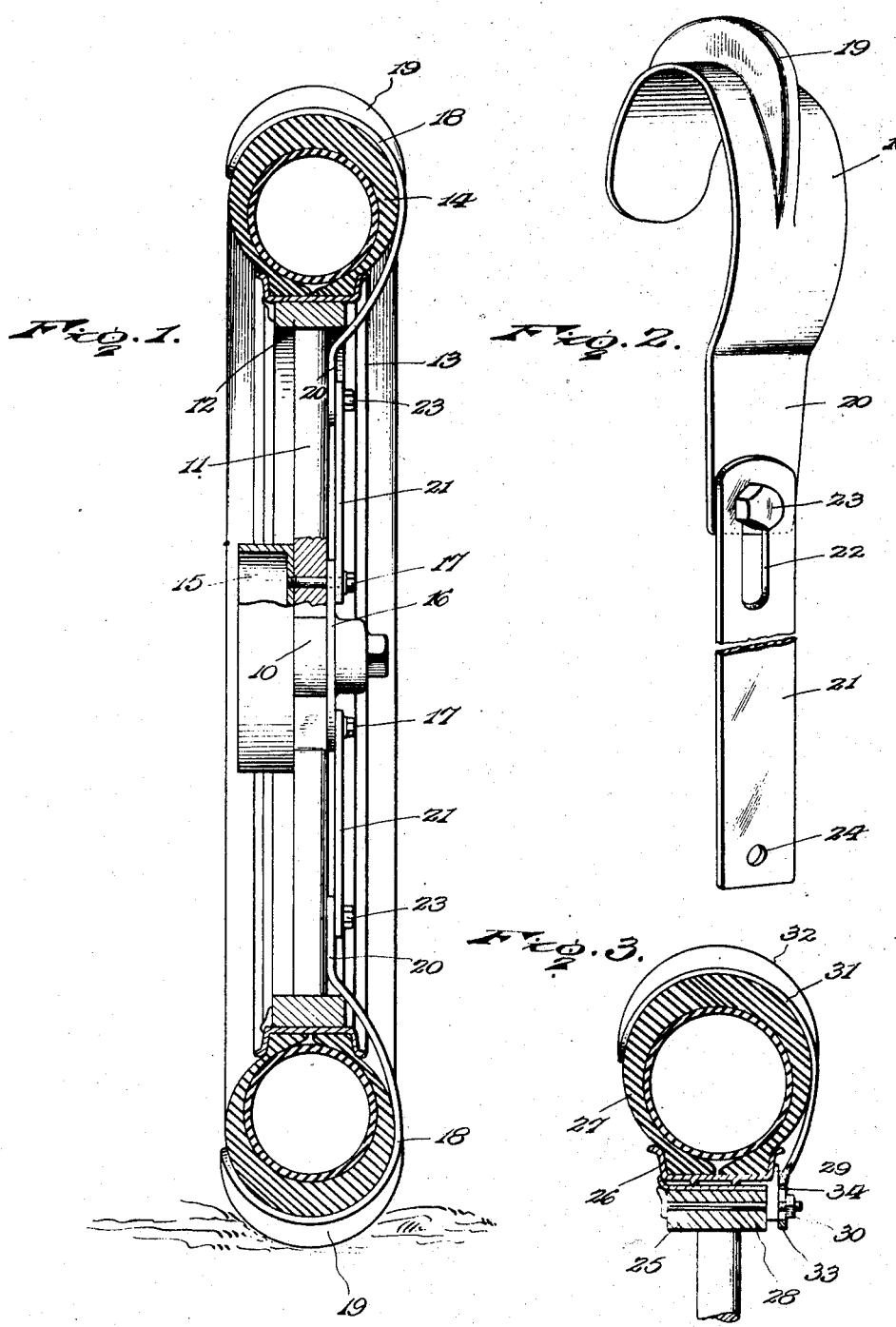
Inventor
J. F. Hayden.
By Lacy & Lacy, Attorneys Patented June 2, 1925.

1,540,470

UNITED STATES PATENT OFFICE.

JOHN F. HAYDEN, OF GALION, OHIO.

MUD HOOK.

Application filed October 6, 1924. Serial No. 741,961.

*To all whom it may concern:*

Be it known that I, JOHN F. HAYDEN, a citizen of the United States, residing at Galion, in the county of Crawford and State of Ohio, have invented certain new and useful Improvements in Mud Hooks, of which the following is a specification.

This invention relates to an improved mud lug for motor vehicles and seeks, among other objects, to provide a device which may be hooked over the tires of the rear wheels of a vehicle and secured to said wheels to provide sure and efficient traction as well as prevent skidding.

The invention further seeks to provide a device which may be adjusted to meet the requirements of different wheels.

And the invention still further seeks to provide a device which will not injure the wheel tires and which may be readily applied.

Other and incidental objects will appear hereinafter.

In the drawings:

Figure 1 is a vertical sectional view showing a conventional wheel equipped with my improved device, Figure 2 is a detail perspective view of the device, and Figure 3 is a detail perspective view showing a slight modification of the invention.

Referring now more particularly to the drawings, I have, for convenience, shown my improved mud hook in connection with a conventional motor vehicle wheel. The wheel hub is indicated at 10, the spokes at 11, and the felly at 12. Removably surrounding the felly is a rim 13 and supported by the rim is a tire 14. Overlying the hub at the inner side of the wheel, or that side of the wheel which is disposed next to the vehicle, is a brake drum 15 and overlying the hub at its outer side is a hub plate 16. In the present instance this plate is shown as being of the type employed to provide a driving connection between the wheel and axle, and extending through the plate, the wheel hub and through the drum 15, are cap bolts 17 removably connecting the plate with the wheel.

As shown in Figure 2, the mud lug of the present invention comprises a flat hook member 18 which, as brought out in Figure 1, is shaped to engage over the tire 14, and rising from said member to extend from side to side of the crown thereof is a medially disposed traction rib 19 reinforcing said member. The hook member 18 is relatively wide so as to avoid injury to the tire and, preferably, the rib 19 is provided with a curved outer edge of a radius substantially equal to the radius of the hook member but eccentric thereto.

The hook member 18 is tapered toward its inner end and is bent to define a shank 20 extending at an angle to the hook member. Connected with said shank is a flat link 21 in the outer end portion of which is formed a longitudinally extending slot 22, and freely received through said slot is a cap bolt 23 connecting the link with said shank. At its inner end, the link is formed with an opening 24 adapted to receive any one of the bolts 17 of the wheel so that, as will be seen, after the hook member 18 has been applied to the tire 14, one of the bolts 17 may be removed and inserted through the opening 24 of the link, when said bolt may be again engaged with the wheel for anchoring the link at its inner end. Accordingly, the link will then serve to hold the hook member 18 in position upon the tire while, by loosening the cap bolt 23, the hook member may be adjusted relative to the link to properly fit the crown of the tire. Furthermore, this adjustment provides a means whereby the device may be readily applied to wheels of different diameters. Any approved number of the devices may, of course, be employed upon any single wheel and, as will now be appreciated, the device will provide sure and efficient traction for the wheel as well as tend to prevent skidding.

In Figure 3 of the drawings, I have illustrated a slight modification of the invention especially adapted for use with wheels not equipped with bolts like the bolts 17, or in any instance wherein a wheel is equipped with hub plate bolts but the nuts of the bolts are disposed at the inner side of the wheel. A conventional wheel felly is indicated at 25. Surrounding the felly is a rim 26 mounting a tire 27 and extending through the felly are bolts 28 carrying clamps 29 and equipped with nuts 30 normally adjustable against the clamps for binding the rim in position, all of this structure being well known. In this embodiment of the invention, I employ a hook member 31 which is similar to the hook member 18 and is provided with an upstanding traction rib 32 like the rib 19. At its inner end, the hook member 31 is provided with a relatively short angularly disposed shank 33 in which is formed a slot 34 freely accommodating the bolt 28. Accordingly, the bolt of the rim clamp serves to anchor the hook member upon the wheel so that the hook member will be supported to extend over the crown of the tire and, as will be seen, the nut 30 for the bolt 28 may be adjusted for tightly binding the shank of the hook member between the nut and the clamp 29.

Having thus described the invention, what I claim is:

1. A mud hook for vehicle wheels including a hook member shaped to fit over a wheel tire and provided at its inner end with a shank to extend radially of the wheel, and a link carried by said shank and provided at its inner end with an opening to accommodate a hub bolt of the wheel anchoring the hook member in position.

2. The combination with a vehicle wheel, a hub plate carried thereby, a bolt connecting said plate with the wheel hub, and a tire carried by the wheel, of a mud hook engaging over the tire and provided at its inner end with a shank extending toward the hub, a link provided at its inner end with an opening accommodating said bolt and anchored to the wheel by said bolt, and means connecting the link with the hook shank.

In testimony whereof I affix my signature.

JOHN F. HAYDEN. [L. S.]